United States Patent [19]
Smith

[11] 3,748,472
[45] July 24, 1973

[54] METHOD OF MEASURING FAST-NEUTRON FLUX

[75] Inventor: Donald L. Smith, Bolingbrook, Ill.

[73] Assignee: The United States of America as represented by the Atomic Energy Commission, Washington, D.C.

[22] Filed: Aug. 11, 1972

[21] Appl. No.: 279,908

[52] U.S. Cl. .............................. 250/371, 250/83.3 R
[51] Int. Cl. .............................................. G01t 3/00
[58] Field of Search ...................... 250/83.1, 83.3 R

[56] References Cited
UNITED STATES PATENTS
2,753,462 7/1956 Moyer et al. ...................... 250/83.1
3,201,590 8/1965 Sun .................................. 250/83.1 X
3,351,758 11/1967 Armantrout et al. ............ 250/83.1 X

*Primary Examiner*—Archie R. Borchelt
*Attorney*—Roland A. Anderson

[57] ABSTRACT

This invention consists of a novel method for measuring the neutron flux of monoenergetic fast-neutrons in the 700–5,000 keV energy range. A shielded, planar lithium-drifted germanium detector is placed so as to view a fast-neutron source. A collimated beam of 700 to 5,000 keV monoenergetic fast-neutrons from the neutron source is impinged upon the Ge(Li) diode of the detector. The number of internal conversion electrons with an energy of 691 keV produced within the Ge(Li) diode due to neutron inelastic scattering are counted and then converted according to a predetermined efficiency ratio for the detector into a value for neutron flux, the number of internal conversion electrons emitted being proportional to the total number of neutrons incident on the detector.

6 Claims, 4 Drawing Figures

METHOD OF MEASURING FAST-NEUTRON FLUX

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the measurement of neutron flux. In particular, the invention relates to a novel method of measuring the neutron flux of monoenergetic fast-neutrons utilizing a lithium-drifted germanium detector.

An increasingly important area in the field of nuclear energy is the detection and measurement of subatomic particles and the study of nuclear reactions created by and producing such particles. Applications in this area range from pure and applied research to direct applications such as with nuclear reactors and in nuclear medicine. A number of known and familiar devices and methods have been utilized for such detection and measurement, a few of which include scintillation counters, gas-ionization chambers and semiconductor devices of both intrinsic and junction types. There has also been some utilization of semiconductor junction devices doped with impurities such as lithium, boron and uranium, which possess large neutron cross sections, for the detection of charged particle products of nuclear reactions arising from exposure to thermal neutrons. There has, however, been a noted lack of research devoted to the consideration of how the nuclear reactions induced by fast-neutron bombardment of the intrinsic material itself in semiconductor junction devices might be utilized for neutron detection.

While methods such as scintillation counting have been relatively satisfactory in the past for determining neutron flux, such methods do contain some objectionable features. For example, organic scintillation is very sensitive to gamma radiation and is difficult to use without having pulsed neutron beams. Also, any slight drift in the required high voltage will cause a change in efficiency, thereby affecting its stability. The inventor, however, has devised a method for detecting neutrons and measuring neutron flux in the energy range of 700 to 5,000 keV which does not contain these objectionable features.

One of the more familiar and widely used devices in the area of nuclear reactions and subatomic particle detection is the lithium-drifted germanium, referred to as Ge(Li), detector. Such Ge(Li) detectors have been employed extensively, due to superior resolution capability, in the measurement of gamma-ray energies and intensities. Occasionally, they have also been utilized for charged-particle measurements. When neutrons of varying energies strike the Ge(Li) diode of such a detector, the characteristic spectra obtained therefrom exhibit lines which are attributable to various neutron-induced reactions including inelastic, $(n, n'\gamma)$, scattering with the lithium, germanium and other materials in the detector. When the incident neutrons' energy, however, exceeds 700 keV, one of the prominent spectral lines occurs at about 691 keV. This line is attributed to the de-excitation of the first-excited state of the intrinsic isotope $^{72}$Ge following excitation by neutron inelastic scattering.

Heretofore, this 691 keV spectral line, although identified as due to the emission of internal conversion electrons during the de-excitation of the $^{72}$Ge first-excited state, has been overlooked in the process of neutron detection and measurement. The inventor, however, has devised a method wherein this trait of the intrinsic $^{72}$Ge isotope is utilized in measuring the fast-neutron flux in the energy range of 700–5,000 keV using a Ge(Li) detector. This method enables the accurate measurement of monoenergetic fast-neutrons in this energy range, yet it is insensitive to thermal neutrons, has gamma-ray discrimination capabilities and is very stable and efficient over a long period of time. Additionally, this method enables the simultaneous measurement of both neutron flux and gamma-ray spectra produced by nuclear reactions.

It is, therefore, one object of the present invention to provide a method for measuring neutron flux.

It is a further object of this invention to provide a novel method of measuring fast-neutron flux utilizing a planar lithium-drifted germanium detector.

It is finally an object of this invention to provide a stable and efficient method of measuring the neutron flux of 700 to 5,000 keV monoenergetic fast-neutrons utilizing the intrinsic $^{72}$Ge isotope in a planar lithium-drifted germanium detector.

Further objects and advantages of the invention will be apparent from the following detailed description of the method.

SUMMARY OF THE INVENTION

In practicing the present invention, a planar lithium-drifted germanium detector is shielded and placed so as to view a monoenergetic neutron source emitting fast-neutrons of known energy, the neutrons being collimated prior to striking the detector. The neutron efficiency ratio (number of internal conversion electrons from the Ge(Li) diode counted/number of fast-neutrons incident on the detector) of the shielded detector is then determined for several neutron energies in the 700 to 5,000 keV energy range by placing a conventional neutron detector such as a fission chamber between the neutron source and the Ge(Li) detector, counting the neutrons incident on the Ge(Li) detector with the fission chamber while simultaneously counting the number of internal conversion electrons produced within the Ge(Li) diode, insuring that appropriate corrections such as for neutron scattering in the shielding and electronic deadtime are included. To measure, then, the neutron flux of an unknown neutron source emitting 700 to 5,000 keV monoenergetic fast-neutrons, a collimated neutron beam from this source is impinged upon the diode of the shielded Ge(Li) detector. The internal conversion electrons produced per unit of time within the Ge(Li) diode due to the de-excitation of the 691 keV $0^+$ first-excited energy state of the intrinsic $^{72}$Ge in the diode following excitation to that state by inelastic scattering of the impinging fast-neutrons are then counted. These counts are converted according to the determined efficiency ratio to a value for neutron flux in terms of neutrons/sec/steradian, the number of internal conversion electrons emitted being proportional to the total number of neutrons incident on the detector.

DETAILED DESCRIPTION OF THE INVENTION

The isotope $^{72}$Ge is one of the few doubly-even nuclei which has a $0^+$ spin and parity for both ground and first-excited states, thus being an exception to the $2^+$ spin and parity first-excited state observed for most medium-weight doubly-even nuclei. The significance of this is that electromagnetic de-excitation of the first-excited state of $^{72}$Ge after excitation due to inelastic fast-neutron scattering must proceed by the emission of an internal conversion electron rather than by gamma-ray emission. The energy value for these emitted electrons has been established at 691.2 keV and always remains at this value regardless of the energy of the impinging fast-neutrons. This results in giving the present method a distinct advantage over prior art methods and devices, as will subsequently be explained.

The $^{72}$Ge isotope is stable and is approximately 27.43 percent abundant in natural germanium, including that utilized in a Ge(Li) detector. It has been found that the $^{72}$Ge($0^+ \rightarrow 0^+$) internal conversion transitions which occur within the active region of the Ge(Li) detector can be observed with nearly 100 percent efficiency by counting the number of 691 keV conversion electrons produced in the detector diode. The inventor has discovered that the number of internal conversion electrons produced within the Ge(Li) diode is proportional to the number of neutrons incident on the detector and therefore by measuring a shielded Ge(Li) detector's neutron efficiency ratio and then counting the number of 691 keV conversion electrons produced within the Ge(Li) diode per unit of time resulting from impinging fast-neutrons from a monoenergetic neutron source, the neutron flux for that particular neutron source can then be determined.

Figure 1:
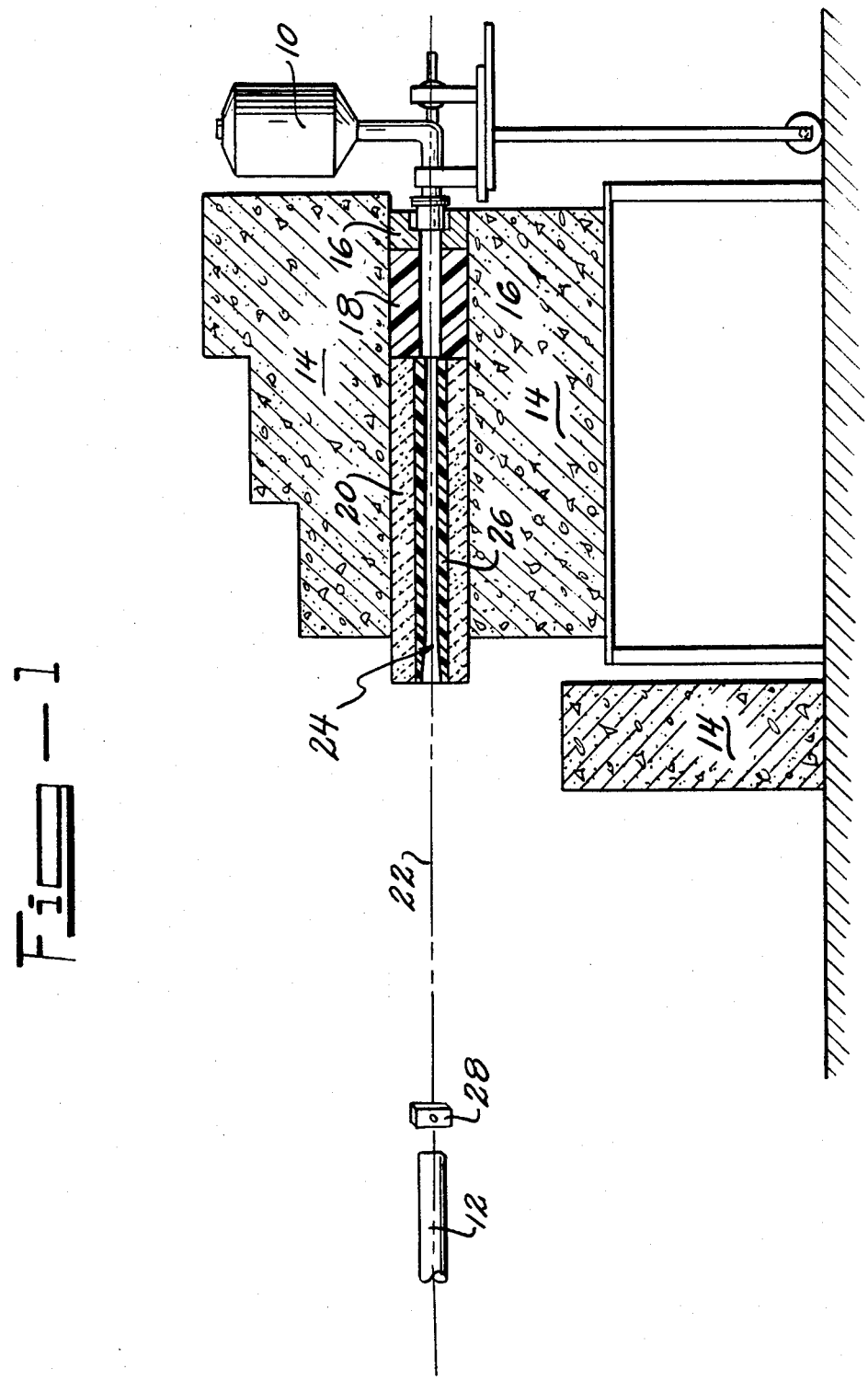
FIG. 1 is a schematic illustrating the apparatuses utilized in testing the present invention.

Turning, now, to FIG. 1 wherein is illustrated a schematic of the apparatus utilized to test the present invention, a planar lithium-drifted germanium detector (including cryostat) 10 was placed in position to view a monoenergetic fast-neutron source 12. Detector 10 was shielded with concrete 14, lead 16, paraffin 18 and boric acid powder 20. A closed shielding geometry was chosen in favor of an open (shadow bar) geometry in order to avoid the sizable air and room scattering corrections which would have been necessary with an open configuration. Monoenergetic fast-neutrons 22 from neutron source 12 were then impinged upon the Ge(Li) diode of detector 10 through a collimator 24 lined with epoxy resin 26. Fission chamber 28 was placed between neutron source 12 and detector 10 for measuring the number of neutrons incident on detector 10 during the neutron efficiency ratio determination. Upon determining the efficiency of detector 10, fission chamber 28 was removed.

The massive shielding insured that most of the neutrons with energies exceeding the threshold of 691 keV which reached detector 10 were neutrons which passed unscattered through the collimator. Boric acid powder was utilized in the central part of the shielding near the collimator due to the large capture cross section of boron for thermal neutrons. Because paraffin thermalizes and then captures fast-neutrons to form deuterium while emitting a 2.2 MeV gamma-ray in the process, the paraffin block was doped with lithium which competes strongly with the hydrogen in paraffin for capturing the thermalized neutrons yet does not give off a gamma-ray in the process. This aids in suppressing the radiative capture background. 5 cm of lead was additionally utilized to further reduce background from gamma-rays produced by neutron capture and neutron-induced reactions in the shielding. The apparatuses shown in FIG. 1 were aligned so that no portion of the lithium-drifted germanium diode crystal in the detector was shielded from the direct neutron flux. Specifications for the particular Ge(Li) detector utilized in the experimental work to test the present invention are given in Table I. The invention, however, is not limited to such.

TABLE I

Specifications for the Ge(Li) Detector

| Description | Specification |
|---|---|
| Configuration | Right-circular cylinder planar |
| Detector Diameter | 2.2 cm |
| Thickness of active region | 1.1 cm* |
| Thickness of p layer | 0.05 cm* |
| Volume of active region | 4.0 cm³* |
| Distance from front face of detector to end cap | 1.8 cm |
| Distance from neutron source to end cap | 261.6 ± 0.6 cm |
| End cap thickness and composition | 0.15 cm - aluminum |

*approximate.

Figure 2:
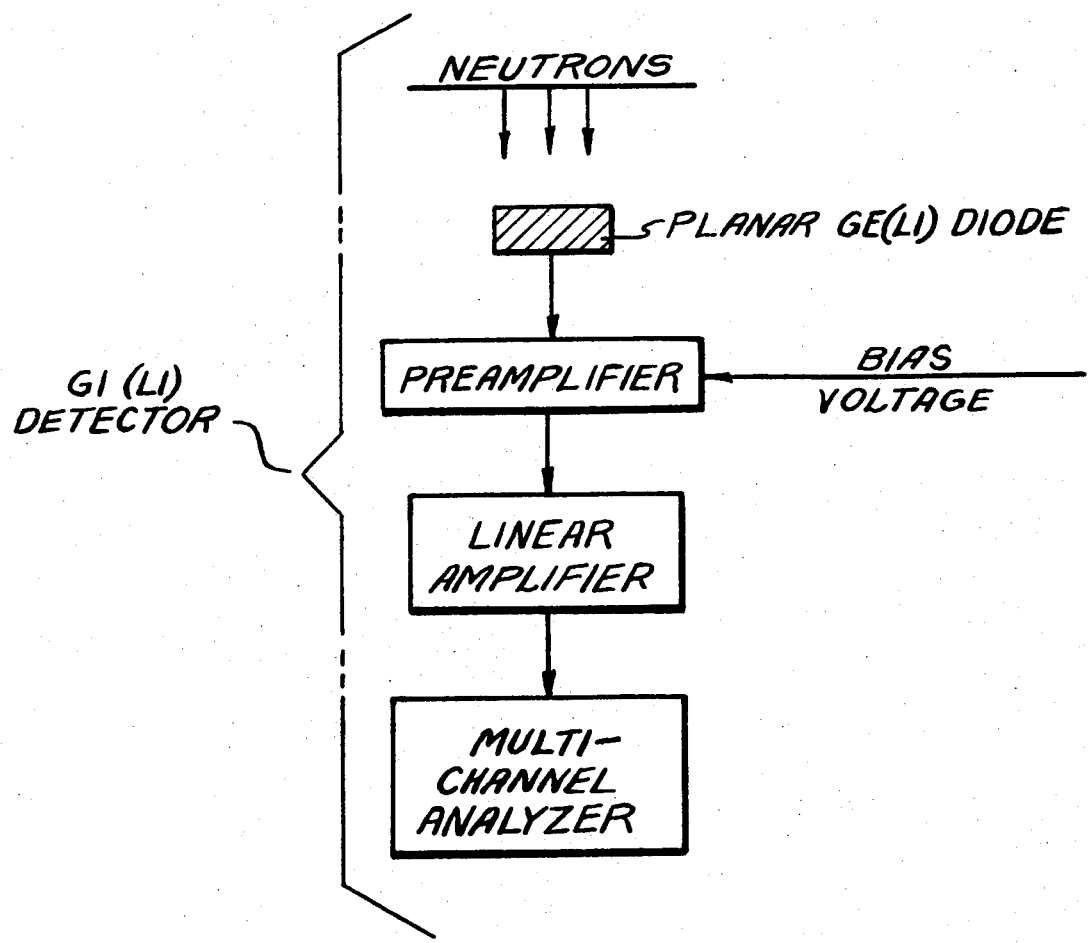
FIG. 2 is a block diagram indicating the components of a typical Ge(Li) detector.

FIG. 2 is a block diagram of a typical Ge(Li) detector which includes a Ge(Li) diode and equipment normally associated therewith, specifically a preamplifier, a linear amplifier and a multichannel analyzer. A bias voltage of about 1,000 volts is applied to the preamplifier. When collimated, monoenergetic fast-neutrons strike the Ge(Li) diode of the detector, internal conversion electrons resulting from de-excitation of the first excited state in $^{72}$Ge via the $^{72}$Ge ($n, n'$) reaction are produced therein if the energy of the impinging neutrons exceeds the threshold of 691 keV. However, detection of such is very difficult below a neutron energy of about 700 keV, because the cross section for this reaction is extremely small below 700 keV and is zero at 691 keV.

Figure 3:
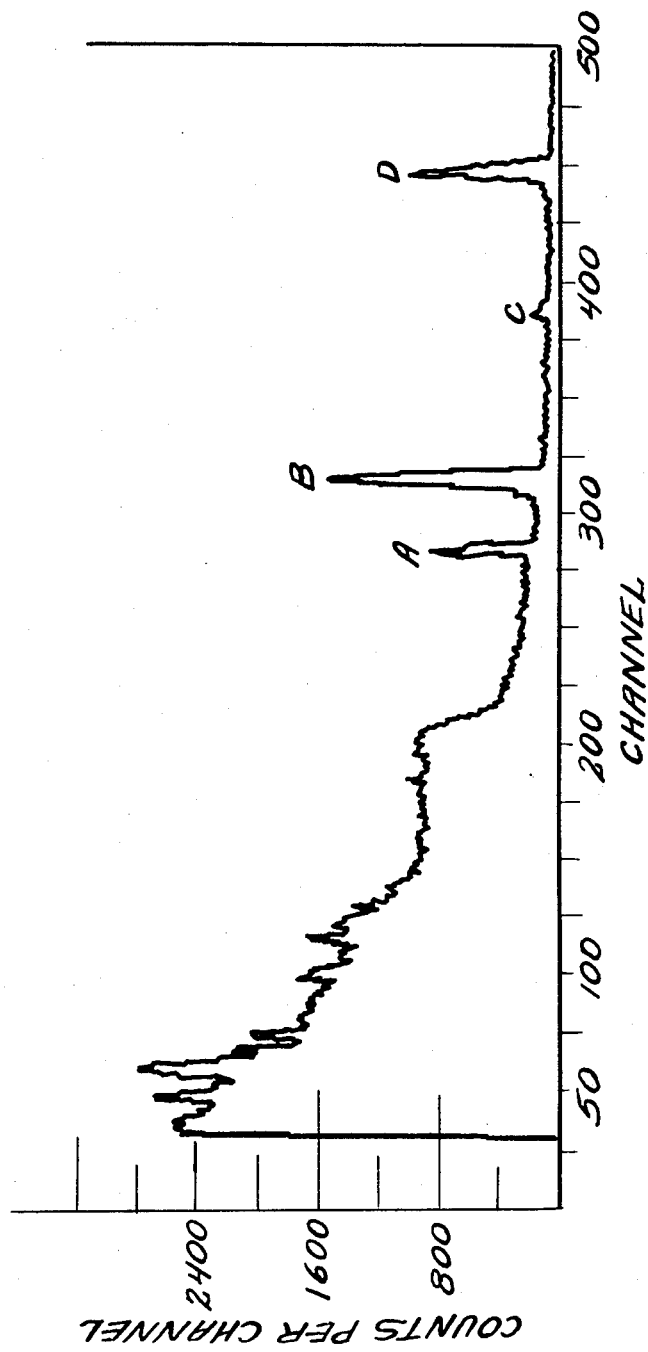
FIG. 3 is a spectrum produced by fast-neutron bombardment of a Ge(Li) detector.

A neutron energy of less than 691 keV is insufficient to excite the $^{72}$Ge nuclei to their $0^+$ first-excited state. This emission of internal conversion electrons in the junction of a Ge(Li) diode produces ionization. The ions are swept to the diode electrodes by the bias voltage to generate a signal which is then shaped and amplified by the preamplifier and the linear amplifier into a form capable of being recorded in spectral form by the multichannel analyzer. FIG. 3 illustrates a typical spectrum obtained when a Ge(Li) detector is bombarded with a collimated beam of 1,000 KeV neutrons.

Considering FIG. 3 in more detail, there are four distinct spectral peaks shown. Peaks A and B are, respectively, 427- and 478-keV lines resulting from gamma-rays produced in the lithium target material which was the neutron source utilized for experimental purposes. Peak C is at 596-keV and results from gamma-rays produced by the de-excitation of the first-excited state of the $^{74}$Ge isotope present in the amount of 36.54 percent in the germanium of the detector. Peak D is the 691-keV spectral line of interest, arising from the ($0^+ \rightarrow 0^+$) internal conversion transitions of $^{72}$Ge. As can be seen from FIG. 3, the 691 keV line can be easily differentiated from the background and the number of counts clearly measured.

As was previously indicated, the efficiency ratio of the shielded Ge(Li) detector must first be measured, the efficiency varying with individual detectors and specific shielding configurations. The efficiency is merely a ratio of the number of conversion electrons produced within the Ge(Li) diode to the total number of neutrons incident on the detector. Therefore, to determine this efficiency ratio, a neutron source emitting monoenergetic neutrons of a known energy in the range of 700 to 5,000 keV is placed so as to be viewed by the shielded detector. A device for measuring the neutron flux of this source is located between the neutron source and the detector. The neutron flux incident on the detector is then measured with this device while simultaneously measuring the number of conversion electrons produced within the shielded detector. This is repeated, then, for a number of neutron energies in the 700 to 5,000 keV range, insuring to include such corrections as shield scattering and electronic deadtime.

While any known method or device may be utilized to measure the number of neutrons incident on the detector during detector efficiency determination, a methane gas ionization chamber was utilized as a fission counter in the present work. The chamber consisted of two 0.025 cm thick stainless steel disks mounted on insulating standoffs inside a 10.2 cm diameter by 6.4 cm high cylindrical steel can with 0.025 cm thick walls. A thin film of uranium, enriched in $^{235}$U, of 2.54 cm diameter was utilized as the fissionable material in the chamber. The total mass of uranium in the deposit was 994 ± 9 micrograms, and the isotopic content was 0.856% $^{234}$U, 93.25% $^{235}$U, 0.332% $^{236}$U and 5.56% $^{238}$U. The uranium film was situated 6.65 ± 0.05 cm from the neutron source.

The neutron source itself consisted of targets of lithium metal evaporated onto tantalum backing cups which were bombarded with direct current proton beams from the Argonne National Laboratory Fast Neutron Generator. The resulting $^7$Li(p,n) $^7$Be nuclear reactions in the lithium targets produced neutrons of varying energies depending upon the proton energies incident on the target material. For proton energies above 2,380 keV, these reactions yield two discrete neutron energy groups with known relative yields.

The conversion of fission chamber counts to neutron flux values required the application of a number of corrections as well as considerable analysis, features which are common to previous neutron detection methods and devices. However, once the Ge(Li) detector efficiency has been measured, such corrections applicable to the fission chamber counts are no longer required for the present invention. One correction must be made for neutron radiation from the tantalum backing in the neutron source for proton energies above 6,000 keV. The magnitude of this was determined from bare tantalum cup measurements, and it was found that a maximum correction of about 1 percent was required for the fission counter at the highest energy utilized while the correction for the Ge(Li) detector was negligible. Geometric corrections were made for the finite solid angle subtended by the uranium film. Neutron scattering and attenuation by various portions of the fission counter were calculated and found to be responsible for a combined net addition to the observed fission counts of about 1 percent, this correction being rather insensitive to the neutron energy. Air scattering was estimated to contribute less than 1 percent to the observed fission chamber counts. Finally, corrections were made for the fact that the $^7$Li(p,n) $^7$Be target reaction produces not just one but actually two distinct neutron energy groups for protons above 2,380 keV.

The major uncertainty in the fission chamber's neutron flux measurement, however, was the uncertainty of the $^{235}$U (n,f) cross sections. It was assumed that established values were accurate to within ±5 percent in the region of interest. It was finally noted that some of the fissions produced small pulses which were masked by α-particle pulses, and a correction was made to compensate for these discriminated fission events. Extrapolation of an assumed flat fission spectrum from this discrimination level to zero pulse height yielded a correction of 2.3 percent, which was essentially the same for all exposures and did not affect the relative efficiency between the fission chamber and the Ge(Li) detector.

Corrections to the conversion electron counts obtained from the shielded Ge(Li) detector were also required. One important correction must be made for counts in the $^{72}$Ge($0^+ \rightarrow 0^+$) internal conversion line which arise from neutrons which have scattered in the shielding. This correction was measured for a number of neutron energies by observing the yield of $^{72}$Ge ($0^+ \rightarrow 0^+$) counts at 691 keV when the collimator was plugged with brass, thereby preventing direct impingement of neutrons on the detector diode. The magnitude of the required correction vs. neutron energy is given in Table II.

TABLE II

Magnitude of Shield Scattering Correction

| Neutron Energy, $E_n$ - keV | Shield Scattering Correction* — % |
|---|---|
| 800 | 0.6 |
| 1200 | 0.8 |
| 1500 | 1.0 |
| 1600 | 1.0 |
| 2000 | 1.4 |
| 2400 | 2.2 |
| 2800 | 3.0 |
| 3200 | 3.6 |
| 3600 | 5.0 |
| 4000 | 6.0 |
| 4400 | 10.0 |
| 4600 | 12.0 |
| 4800 | 14.0 |
| 5000 | 18.0 |

*Uncertainty in corrections is about ±20%.

This correction is a function of the specific shielding configuration of the detector, and therefore these same corrections are applicable to the same or a similar detector so long as the shielding configuration remains essentially the same as that shown in FIG. 1.

A second factor taken into consideration when determining the correct Ge(Li) detector counts was the electronic deadtime. This is the deadtime during which the multichannel analyzer digests and records the counts it has received. During this time other events occur but are not counted. To determine the effect of this factor, the pulse height spectra from the Ge(Li) detector were recorded in a pulse-height analyzer, and both real time and livetime were recorded for each exposure so that deadtime corrections could be made. The deadtimes which occurred were found to be quite small, less than 2 percent.

Another factor which was considered was the dependency of the detector efficiency on the bias voltage applied to the Ge(Li) detector. Measurements were made using a $^{137}$Cs gamma-ray source placed near the detector, and it was determined that the detector efficiency was insensitive to the applied bias voltage over a range of 500 to 1,500 volts D.C. for the detector used to test the present invention.

In order that correct conversion electron counts are obtained for the Ge(Li) detector, the background as indicated by the fluctuating horizontal line at the base of the peaks in FIG. 3 must be subtracted from the peak counts. This structureless background is partially due to Compton scattering of gamma-rays. In addition, peak area uncertainties calculated by combining the statistical uncertainities and the uncertainties associated with the background subtraction procedure must also be taken into consideration when subtracting the background from the peak counts.

Once these correction quantities have been measured, they are applied to the fission chamber counts and the detector counts by way of any automatic processing means, such as a calculator or computer. Applying these various corrections to the measured neutron flux of a neutron source emitting 1,500 keV monoenergetic fast-neutrons as well as to the Ge(Li) detector conversion electron counts, an absolute efficiency ratio for the shielded Ge(Li) detector utilized in the present experimental work for 1,500 keV fast-neutrons was found to be $(8.2 \pm 0.5) \times 10^{-4}$. Table III is a list of some of the efficiency ratios determined in the described manner for monoenergetic fast-neutrons in the energy range of 700 to 5,000 keV.

TABLE III

Absolute Efficiency Ratios of a Shielded Ge(Li) Detector for Monoenergetic Fast-Neutrons in the 700-5000 keV Energy Range

| Neutron Energy, $E_n$ (keV) | Absolute Efficiency ($\times 10^{-4}$) | Neutron Energy, $E_n$ (keV) | Absolute Efficiency ($\times 10^{-4}$) |
|---|---|---|---|
| 719 | 1.2 ± 0.1 | 2617 | 4.9 ± 0.3 |
| 1000 | 6.8 ± 0.4 | 3045 | 5.2 ± 0.3 |
| 1221 | 7.6 ± 0.5 | 3453 | 5.0 ± 0.3 |
| 1500 | 8.2 ± 0.5 | 3796 | 4.5 ± 0.3 |
| 1600 | 8.3 ± 0.5 | 3994 | 4.4 ± 0.3 |
| 1802 | 7.0 ± 0.4 | 4413 | 2.7 ± 0.2 |
| 2220 | 6.5 ± 0.4 | 4814 | 3.4 ± 0.2 |
| 2411 | 5.3 ± 0.3 | 4996 | 2.6 ± 0.2 |

Once having determined these efficiency ratios for a particular shielded Ge(Li) detector, the method of measuring the neutron flux within the 700 to 5,000 keV energy range of any monoenergetic fast-neutron source is rather straightforward. The shielded Ge(Li) detector whose efficiency has been determined is located so as to view a particular monoenergetic fast-neutron source. The number of internal conversion electrons emitted by the Ge(Li) diode of the detector per unit of time are then counted, insuring that the corrections for shield scattering, electronic deadtime and background are applied to these counts. The corrected counts are then divided by the appropriate efficiency number which results in giving the total number of fast-neutrons of that particular energy level incident on the detector per unit of time. This is then merely converted to neutron/sec/steradian to obtain the neutron flux. It should be noted that the scale of the detector's spectrum could be previously calibrated so as to give a direct readout in terms of neutron flux rather than one of conversion electron counts.

For example, a 50 keV thick lithium target, as measured at the threshold proton energy of 1,881 keV, is bombarded by a 5 microampere, 2.7 MeV proton beam, thereby producing neutrons, 10 percent of which have an energy of about 600 keV and 90 percent of which have an energy of about 1,000 keV. If these neutrons are impinged upon a sodium sample in order to study, say, the $^{23}$Na $(n, n'\gamma)$ $^{23}$Na reaction, knowledge of the neutron flux is essential. Therefore, to obtain the neutron flux in accordance with the present invention, a shielded Ge(Li) detector as described above is placed to view the neutron source at a distance of 1 meter. The front face area of the detector is 3.8 cm$^2$ which results in a solid angle ($\Omega$) of $3.8 \times 10^{-4}$ steradians ($\Omega$ = front face area in cm$^2$/(distance in cm between n-source and detector)$^2$).

The Ge(Li) detector counts are then measured and corrected for shield scattering, electronic deadtime and background. This results in about 4,186 counts/hr or 11.6 counts/sec. The efficiency, from Table III, of the detector for 1,000 keV neutrons is $6.8 \times 10^{-4}$. Dividing the corrected detector counts by the efficiency, the total number of 1,000 keV fast-neutrons incident on the detector is about $1.71 \times 10^4$ neutrons/sec. Converting this to neutron flux by dividing by the solid angle, the neutron flux for the 1,000 keV fast-neutrons in this situation is about $4.5 \times 10^7$ neutrons/sec/steradian. While the 600 keV neutron flux cannot be measured directly using the present invention, the knowledge that $1.71 \times 10^4$ neutrons/sec for 1,000 keV neutrons comprises 90 percent of the collimated neutron beam incident on the detector enables the calculation of the 600 keV neutron flux. Thus, 10 percent of the beam would result in about $1.9 \times 10^3$ 600-keV neutrons/sec incident on the detector, and dividing this quantity by the solid angle results in a neutron flux of about $5.0 \times 10^6$ neutrons/sec/steradian for the 600-keV neutrons.

Figure 4:
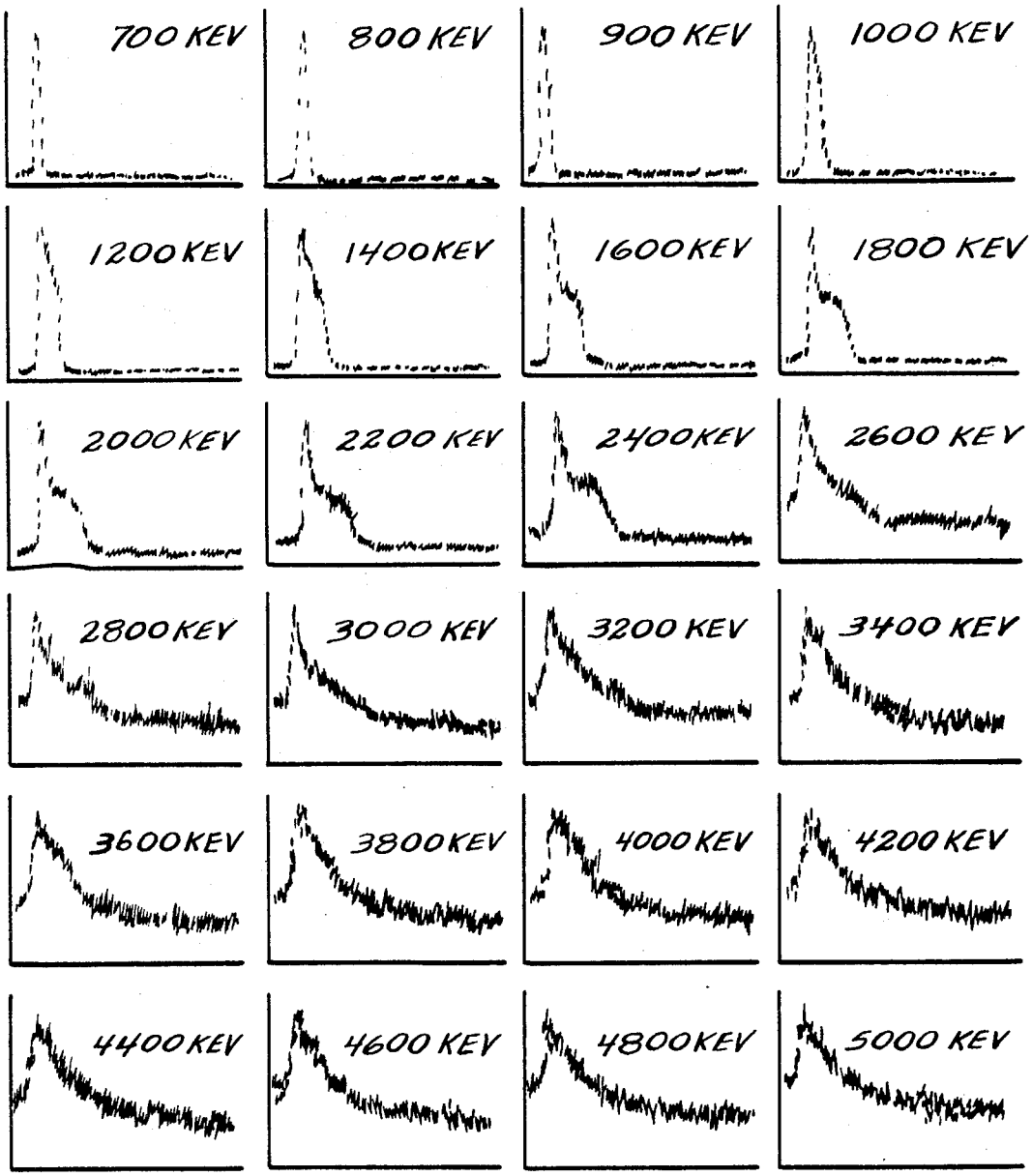
FIG. 4 is a series of spectra showing the 691 keV spectral lines resulting from monoenergetic fast-neutrons of 700 to 5,000 keV striking a Ge(Li) detector.

Because impinging fast-neutrons having an energy of less than 691 keV will not raise the $^{72}$Ge nuclei to their first-excited state, and because, as previously explained, neutrons having energies less than 700 keV cannot be easily detected, the present invention is limited to the detection of monoenergetic fast-neutrons having energies of at least 700 keV, as is evident from the above example. Likewise, the upper neutron energy limit of the present invention is about 5,000 keV. This upper limitation is due to the fact that a characteristic of some of the spectral lines generated by direct neutron bombardment of Ge(Li) detectors is that they broaden with increased neutron energy. The explanation for this phenomenon is that the recoil energy of the bombarded germanium atoms is added to the energy released by the electromagnetic de-excitation of the nuclei. The recoil energy depends upon the neutron scattering angle, so one observes a distribution which is broadened toward larger pulse-heights up to a limit corresponding to 180° scattering of the incident neutrons. The peak-to-background ratio, therefore, deteriorates with increased neutron energy. This limits the accuracy to which neutron flux measurements can be made at the higher neutron energies. FIG. 4 illustrates the $^{72}$Ge internal conversion line at 691 keV obtained for neutrons having various energies in the range of 700–5,000 keV impinged upon a Ge(Li) detector. As can be seen from FIG. 4, the recoil broadening makes it increasingly difficult to determine the background under the $^{72}$Ge ($0^+ \to 0^+$) internal conversion line. This places an upper limit of about 5,000 keV on the neutron energies for which the present invention can be utilized for detection and measurement of fast-neutrons.

It is also clear that the present invention could not be effectively used, under normal circumstances, to measure neutron flux when several neutron energies or a distribution of energies is present, This, then, limits the present invention basically to the measurement and detection of monoenergetic neutrons. However, as in the above example, such measurements of neutrons that are not monoenergetic would be possible with the present invention if one knew the neutron energy distribution and lacked only the absolute normalization.

The present invention, however, does have gamma-ray discrimination capabilities. Discrimination of gamma-radiation in the detection of fast-neutrons with a Ge(Li) detector is due to the fact that the gamma-rays do not interfere with the $^{72}$Ge ($0^+ \to 0^+$) internal conversion line. Further, because the conversion electrons are always produced at the energy level of 691.2 keV, the internal conversion lines can always be easily identified and directly compared and correlated at different neutron energies. This is not true with prior devices. Variation of impinging neutron energy will shift the corresponding spectrum cutoff point and thereby require additional calculations and corrections in order to compare and correlate counts received at different neutron energies. This, therefore, gives the present invention a distinct advantage over such prior devices and methods.

The threshold of 691 keV for excitation of the $^{72}$Ge $0^+$ first-excited state by neutron inelastic scattering further gives the present invention a favorable advantage for fast-neutron detection because it insures insensitivity of the detector to low-energy scattered background which always accompanies the primary fast-neutron beam. This is especially important because no timing conditions, such as time-of-flight measurements, can be imposed on the present invention due to the relatively long half-life, 422 ± 13 nanoseconds, of the $^{72}$Ge $0^+$ first-excited state.

The stability of the present invention was monitored during the various neutron exposures by observing the full-energy peak yield from a $^{137}$Cs gamma-ray source placed near the Ge(Li) detector in a fixed position. It was found that the detector and method remained quite stable throughout all of the testing and the various neutron exposures.

An additional unique advantage of the present invention is that the Ge(Li) detector can be calibrated for gamma-ray detection, which is a normal function of a Ge(Li) detector, as well as for neutron detection. Therefore, gamma-ray measurements of a radio-active source may be made simultaneously with the fast-neutron flux measurements. Further, knowledge of the gamma-ray field in turn gives a good indication of the manner in which the neutron radiation is being affected by the environment since much of the gamma-radiation is generated by inelastic scattering, capture, etc.

For example, if 100 micrograms/cm$^2$ of boron-10 is bombarded with a 5 microampere proton beam, 1,500 keV fast-neutrons are generated by the nuclear reaction $^{10}$B (p,n) $^{10}$C. Furthermore, gamma-rays are produced through inelastic scattering of the protons, $^{10}$B (p,p') $^{10}$B, and positrons are generated by the following nuclear reaction,

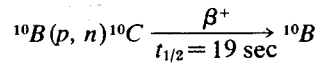

$$^{10}B(p, n)^{10}C \xrightarrow[t_{1/2} = 19 \text{ sec}]{\beta^+} {}^{10}B$$

Utilizing the present invention, the shielded Ge(Li) detector of the previous example is placed 1 meter from the boron-10 target. The front face area of the detector is again 3.8 cm$^2$, so the solid angle remains the same, 3.8 × 10$^{-4}$ steradians. The detector counts are then measured and corrected for shield scattering, background and electronic deadtime, resulting in about 58.9 counts/sec. Dividing this by the efficiency from Table III for 1,500 keV fast-neutrons, this being 8.2 × 10$^{-4}$, the number of 1,500 keV fast-neutrons incident on the detector is thereby obtained, 7.2 × 10$^4$ neutrons/sec. Dividing this quantity by the solid angle gives a nutron flux of about 1.9 × 10$^8$ neutrons/sec/steradian for 1,500 keV fast-neutrons. In addition, observation of the yield of the 720 keV and 1,040 keV peak lines resulting from gamma-rays permits the measurement of the ratio of cross sections for the nuclear reactions $^{10}$B (p,n) $^{10}$C and $^{10}$B (p,p') $^{10}$B in accordance with known Ge(Li) detector gamma-ray measurement techniques.

It should be pointed out that Ge(Li) detectors are subject to radiation damage from fast-neutron bombardment. Although the mechanisms for radiation damage are not well known, the symptoms of such incipient radiation damage include tailing of the spectral lines and general deterioration of resolution. It has been suggested that Ge(Li) detectors suffer the effects of radiation damage after an integrated dose of fast-neutrons of about 10$^{10}$ neutrons/cm$^2$. The Ge(Li) detector utilized the present experimental work, however, had a previous history of neutron exposure and during the present work received an additional dose of approximately 10$^{10}$ neutrons/cm$^2$. While a slight deterioration in the performance of the detector was observed, this did not alter its accuracy or ability to be utilized in the detection and measurement of fast-neutrons. Furthermore, once a Ge(Li) detector has incurred sufficient radiation damage to prohibit its use in the present invention, it can be re-drifted and thereby brought back to pre-irradiation specifications. Therefore, neutron damage to the Ge(Li) detector is not a serious deterrent or detriment to the present invention.

The neutron detection efficiency of a Ge(Li) detector is not large, as can be seen in Table III. However, where the measurement of the average neutron flux of monoenergetic fast-neutrons having an energy of 700 to 5,000 keV is all that is required, the present invention is very adequate and has some significant advantages over prior art methods and devices.

It will be understood that the present invention is not to be limited to the details given herein but that it may be modified within the scope of the appended claims.

The embodiments of the invention in which an exclusive property or privilege is claimed are defined as follows:

1. A method of measuring the neutron flux of 700 to 5,000 keV monoenergetic neutrons comprising impinging a beam of collimated monoenergetic fast-neutrons having an energy of 700 to 5,000 keV upon a lithium-drifted germanium detector, counting the number of internal conversion electrons produced within said detector, and determining the value of the neutron flux for said monoenergetic neutron beam from the number of said internal conversion electron counts in accordance with a previously measured efficiency ratio for said detector.

2. A method of measuring the neutron flux of 700 to 5,000 keV monoenergetic neutrons utilizing a planar lithium-drifted germanium detector, comprising shielding said detector; measuring the neutron efficiency ratio of said shielded detector for each of several fast-neutron energies in the 700 to 5,000 keV energy range; impinging a collimated beam of monoenergetic fast-neutrons having an energy of 700 to 5,000 keV upon the lithium-drifted germanium diode of said shielded detector, whereby internal conversion electrons are produced during the de-excitation of the 691 keV $0^+$ first-excited energy state of the $^{72}$Ge isotope intrinsically present in said detector's diode following excitation to said state by inelastic scattering of said impinging fast-neutrons; counting the number of internal conversion electrons produced within said detector's diode; and determining the value of the neutron flux for said monoenergetic neutron beam from the number of said internal conversion electron counts in accordance with said previously determined efficiency ratio, said internal conversion electron count being proportional to the total number of neutrons incident on said detector.

3. The method according to claim 2 wherein said efficiency ratio is measured by impinging a beam of collimated monoenergetic fast-neutrons having a known energy within said 700 to 5,000 keV energy range upon the lithium-drifted germanium diode of said shielded detector, measuring simultaneously the number of neutrons incident on said detector's diode and the number of internal conversion electrons being produced therein, and dividing said number of conversion electrons produced by said number of incident neutrons, repeating said measurements for each of several impinging fast-neutron energies within said energy range.

4. The method according to claim 2 wherein said internal conversion electron counts are corrected for neutron scattering within said shielding, background radiation and electronic dead-time.

5. A method of measuring the neutron flux of 700 to 5,000 keV monoenergetic neutron utilizing a planar lithium-drifted germanium detector having a lithium-drifted germanium diode wherein approximately 27 percent of the germanium in said diode consists of the isotope $^{72}$Ge, comprising shielding said detector so as to insure that most of the neutrons with energies exceeding 691 keV which reach said detector are collimated unscattered neutrons, no portion of said detector diode being shielded from direct neutron flux; measuring the neutron efficiency ratio of said shielded detector for each of several fast-neutron energies in the 700 to 5,000 keV energy range; placing a monoenergetic fast-neutron source a measured distance from and in view of said detector diode; measuring the solid angle of said detector; impinging a beam of 700 to 5,000 keV monoenergetic fast-neutrons from said neutron source upon said shielded detector diode, whereby internal conversion electrons are produced during the de-excitation of the 691 keV $0^+$ first-excited energy state of the $^{72}$Ge isotope following excitation to said state by inelastic scattering of said impinging fast-neutrons; counting the number of 691 keV internal conversion electrons produced within said diode per second; and determining the value of the neturon flux for said monoenergetic neutron beam in neutrons/-second/steradian from the number of said internal conversion electron counts in accordance with said previously determined efficiency ratio, said internal conversion electron count being proportional to the total number of neutrons incident on said detector.

6. The method according to claim 5 wherein said efficiency ratio is measured by impinging a beam of collimated monoenergetic fast-neutrons having a known energy within said 700 to 5,000 keV energy range upon the diode of said shielded detector, measuring simultaneously the number of neutrons incident on said detector diode and the number of internal conversion electrons being produced therein, and dividing said number of conversion electrons produced by said number of incident neutrons, repeating said measurements for each of several impinging fast-neutron energies within said energy range.

* * * * *